June 21, 1949.   F. C. HULL   2,473,886
BRAZING ALLOY
Filed June 30, 1947
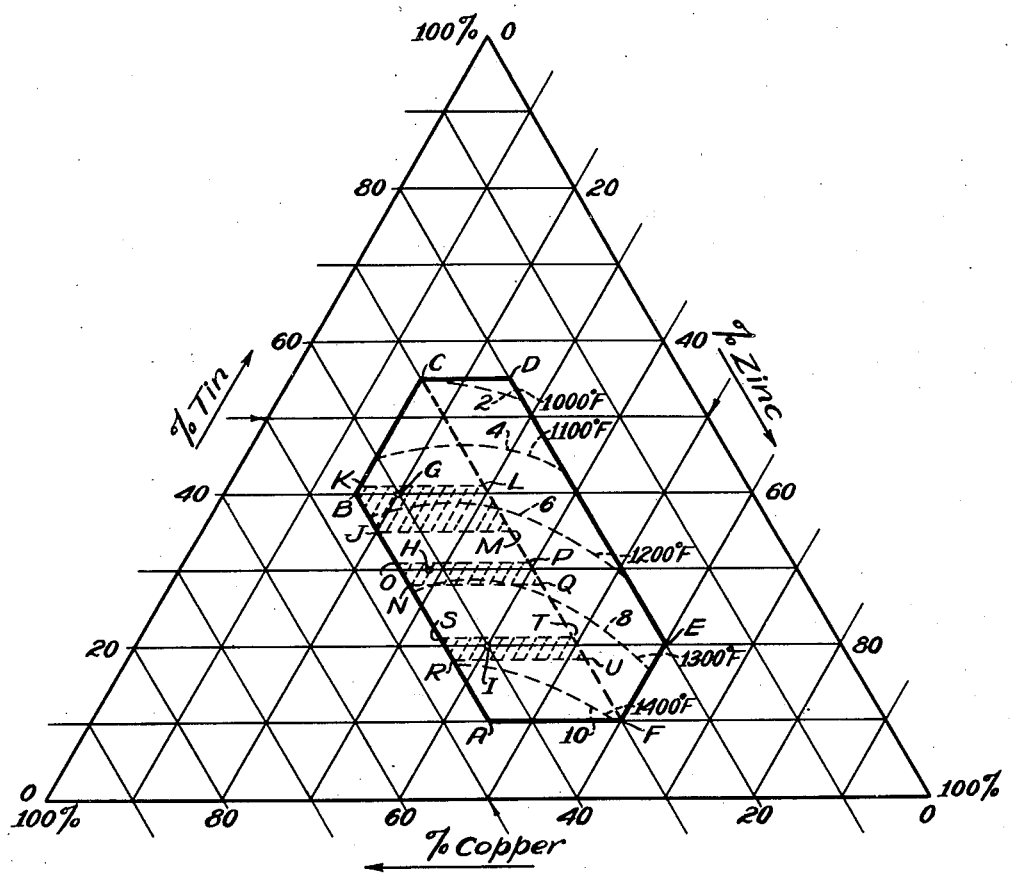
WITNESSES:
Robert C. Baird
Nw. C. Groome
INVENTOR
Frederick C. Hull.
BY
James N. Ely
ATTORNEY Patented June 21, 1949

2,473,886

UNITED STATES PATENT OFFICE 2,473,886

BRAZING ALLOY

Frederick C. Hull, Pittsburgh, Pa., assignor to Westinghouse Electric Corporation, East Pittsburgh, Pa., a corporation of Pennsylvania Application June 30, 1947, Serial No. 758,204

5 Claims. (Cl. 75—134)

This invention relates to alloys, and in particular to alloys suitable for use as brazing alloys.

Many brazing alloys are known and have been used extensively in industry. The silver solder brazing alloys have been used in automatic brazing operations for the brazing of filament leads to metals of the class exemplified by Patent No. 1,942,260, issued January 2, 1934, to H. Scott, but the high melting points of the silver solders and their excessive cost detract from the desirability of using such solders.

An object of this invention is the production of a brazing alloy having a predetermined liquidus temperature.

Another object of this invention is to provide a copper-tin-zinc brazing alloy which is economical to produce and which will have a predetermined liquidus temperature.

Other objects of this invention will become apparent from the following description when taken in conjunction with the accompanying drawing, the single figure of which is a copper-tin-zinc ternary constitutional diagram illustrating the alloys of this invention.

The alloys of this invention preferably consist of copper, tin and zinc in amounts within the field defined by straight lines drawn between the points ABCDEFA of the accompanying ternary constitutional diagram. The alloys within this field have good brazing characteristics and are outstanding, in that they are formed of relatively low cost constituents, have favorable liquidus and solidus ranges and have exceptionally good wetting properties for both ferrous and non-ferrous alloys including such metals as steel, nickel and iron-nickel alloys including those disclosed in the aforementioned Scott Patent No. 1,942,260.

In producing and using the copper-tin-zinc alloys of this invention, it is found that the copper increases the solidus temperatures of mixtures of tin and zinc and enables the resulting brazed joint to withstand exposure to temperatures such as are employed in soft soldering operations. On the other hand, the tin lowers the melting point of mixtures of copper and zinc and also decreases vaporization loss of zinc during brazing operations. Zinc also decreases the melting point of mixtures of copper and tin and has the effect of decreasing the hardness and brittleness of such mixtures.

The boundary of the field designated on the accompanying diagram is determined by the points identified and having the composition as given in the following table:

|   | Percent by weight | | |
|---|---|---|---|
|   | Cu | Sn | Zn |
| A | 45 | 10 | 45 |
| B | 45 | 40 | 15 |
| C | 30 | 55 | 15 |
| D | 20 | 55 | 25 |
| E | 20 | 20 | 60 |
| F | 30 | 10 | 60 |

Generally, the range of the constituents may be said to be 20% to 45% by weight of copper, 10% to 55% by weight of tin and 15% to 60% by weight of zinc, it being understood that in no event will the composition be more nor less than 100%.

In practice it is found that if the copper content is greater than 45%, that is, to the left of the line AB of the ternary diagram, an extremely hard and brittle phase appears which is detrimental to the strength of the alloy. Further, if more than 45% of copper is employed, the liquidus temperature of the alloy increases rapidly. On the other hand, if less than 20% of copper is employed, that is, to the right of the line DE of the diagram, the liquidus temperature becomes too low and the resulting alloys are too soft and weak.

At least 15% of zinc, that is, within the boundaries of the field and below the line BCD of the diagram, is required to counteract the extreme brittleness of the copper-tin mixture, whereas at least 10% of tin, that is, within the field and above the line AFE of the diagram, is required to improve the wettability of the alloy.

In a preferred embodiment it is preferred to utilize the alloys falling within the field designated by the lines ABCFA as opposed to the broader range outlined by the boundaries ABCDEFA as the alloys in the narrower range are not quite as soft and weak as those to the right of the line CF of the diagram.

Selection of specific alloys for particular use depends upon the liquidus temperature desired. The liquidus temperatures of alloys within the broad field designated are represented by the lines 2, 4, 6, 8 and 10 in the accompanying ternary diagram, which lines represent liquidus temperatures of 1000° F. through 1400° F. in 100° F. steps. As illustrated, for a given liquidus temperature the composition may vary along the liquidus line. In general, the compositions having the higher zinc content for any given constant liquidus temperature will be softer but will have a higher coefficient of expansion.

The alloys within the shaded area of the diagram designated by the points JBKLMJ are particularly useful in applications where the brazing is done by induction heating methods where heat is developed at a fast rate. These alloys have a general composition of 35% to 42% tin, 30% to 45% copper and the balance zinc and have a liquidus temperature between 1150° F. and 1225° F. The specific alloy designated by the letter G on the diagram and having a composition of 40% copper, 20% zinc and 40% tin is particularly useful in the brazing of articles such as sealed beam headlights. The latter alloy has a coefficient of thermal expansion of 22.9 x $10^{-6}$ inches per inch per °C.

The low melting point of the alloys in the field defined by the boundaries JBKLMJ of the diagram minimizes the possibility of alloying of the brazing alloy to a detrimental degree with the metals being brazed and facilitates the use of automatic brazing technique as by induction heating. Further, the lower melting point of these metals makes possible the brazing of metals with a minimum of oxidation of the metals being brazed, thereby simplifying the cleaning of the metals as required by previous practice prior to soft soldering operations.

The alloys defined by the boundary NOPQ on the diagram are also particularly useful as brazing alloys having a range of from 27% to 31% tin, 30% to 45% copper with the balance zinc. These alloys have a liquidus temperature somewhat higher than the specific field described hereinbefore, the liquidus temperature ranging from 1275° F. to 1310° F. The specific alloy having the composition 30% tin, 42% copper and 28% zinc, designated by the letter H on the diagram has exceptionally good brazing characteristics, having a favorable melting point with respect to common commercial fluxes.

A preferred range of the composition having a low tin content is that defined by the boundaries RSTU on the accompanying diagram and having a composition of 17% to 21% tin, 30% to 45% copper and the balance zinc. The alloys within this group may be substituted directly in industrial applications for silver solders of the prior art without any change in the production methods utilized. The alloy identified in the diagram as I and having a composition of 40% copper, 20% tin and 40% zinc is a particularly good substitute for the silver solders and has very good wetting characteristics. The alloys within the boundaries RSTU have a liquidus temperature between 1350° F. and 1400° F. and have a coefficient of thermal expansion of approximately 23.4 times $10^{-6}$ inches per inch per °C.

In general, the alloys of this invention are somewhat brittle but can be readily fabricated for use in industrial brazing operations. For example, the cast alloy can be crushed, ground into powders or can be supplied in the form of chips produced by crushing, grinding or machining the cast alloy. The powders can be compacted under pressure into any predetermined shape without the use of lubricants and the compact thus formed is employed for positioning the alloy with respect to the articles to be brazed. Loose powders of the alloy either in the form of the alloy by itself or mixed with a suitable flux can also be employed in effecting brazed joints. Another mode of preparing the brazing alloy is by any of the well-known shotting processes. Where desired, rings or small plates or rods can be precision cast to final shape and positioned with respect to the work. Satisfactory joints have been produced where the brazing has been effected, as by means of torch brazing, using small die cast bars of the brazing alloys.

The alloys of this invention are economical to produce and give outstanding success in the making of brazed joints. The alloys can be readily duplicated to give any required liquidus temperature as indicated on the diagram.

I claim as my invention:

1. A brazing alloy consisting of copper, tin and zinc in amounts lying within the field defined by lines drawn between points ABCDEFA in the ternary diagram of the accompanying drawing.

2. A brazing alloy consisting of 35% to 42% tin, 30% to 45% copper and the balance zinc, the alloy having a liquidus temperature between 1150° F. and 1225° F.

3. A brazing alloy consisting of 17% to 21% tin, 30% to 45% copper and the balance zinc, the alloy having a liquidus temperature between 1350° F. and 1400° F.

4. A brazing alloy consisting of 27% to 31% tin, 30% to 45% copper and the balance zinc, the alloy having a liquidus temperature between 1275° F. and 1310° F.

5. A brazing alloy consisting of 40% tin, 20% zinc and 40% copper.

FREDERICK C. HULL.

REFERENCES CITED

The following references are of record in the file of this patent:

UNITED STATES PATENTS

| Number | Name | Date |
|---|---|---|
| 1,792,146 | Corson | Feb. 10, 1931 |